(12) United States Patent
Coleburn

(10) Patent No.: US 6,485,151 B2
(45) Date of Patent: Nov. 26, 2002

(54) MOTORCYCLE MIRROR PROVIDING RIDER CONCURRENT VIEWING OF ROAD TO THE SIDE AND IMMEDIATELY TO THE REAR OF MOTORCYCLE

(76) Inventor: Michael P. Coleburn, P.O. Box 1318, Coupeville, WA (US) 98239

( * ) Notice: Subject to any disclaimer, the term of this patent is extended or adjusted under 35 U.S.C. 154(b) by 0 days.

(21) Appl. No.: 09/728,969

(22) Filed: Dec. 4, 2000

(65) Prior Publication Data

US 2002/0067557 A1 Jun. 6, 2002

(51) Int. Cl.[7] .............................. G02B 7/18; B60R 1/08; B60R 1/02
(52) U.S. Cl. .................. 359/842; 359/850; 359/866; 359/872; 359/881; 248/480
(58) Field of Search .................. 359/842, 850, 359/855, 854, 865, 866, 871, 838, 872, 875, 881; 248/476, 479, 480

(56) References Cited

U.S. PATENT DOCUMENTS

| | | | | |
|---|---|---|---|---|
| 2,585,651 A | * | 1/1952 | Peterson | 359/865 |
| 4,200,359 A | * | 4/1980 | Lawson | 359/850 |
| 4,252,290 A | * | 2/1981 | Willey | 248/549 |
| 4,311,363 A | * | 1/1982 | Marsalka et al. | 359/864 |
| 4,598,982 A | * | 7/1986 | Levine | 359/865 |
| 4,832,476 A | * | 5/1989 | Gabrielyan | 359/865 |
| 5,331,461 A | * | 7/1994 | Hwang | 359/507 |
| 5,594,594 A | * | 1/1997 | Ung | 359/855 |
| 5,691,855 A | * | 11/1997 | Lupkas | 359/865 |
| 6,062,699 A | * | 5/2000 | O'Dea | 359/850 |

FOREIGN PATENT DOCUMENTS

| | | | | |
|---|---|---|---|---|
| AU | 0157845 | * | 7/1954 | 359/865 |
| DE | 2331633 A | * | 6/1974 | 359/866 |
| GB | 2230750 A | * | 10/1990 | 359/842 |
| GB | 2252946 A | * | 8/1992 | 359/850 |
| JP | 9-024873 A | * | 1/1997 | |

* cited by examiner

Primary Examiner—Cassandra Spyrou
Assistant Examiner—John Juba, Jr.
(74) Attorney, Agent, or Firm—Donn K. Harms

(57) ABSTRACT

A motorcycle rear view mirror assembly for addition to motorcycles and like vehicles providing a view of both the rear sides, and directly behind and adjacent to the rear of the motorcycle which will increase the safety of the operator when changing lanes and will make the rider aware of vehicles approaching too close behind them. The device features a first mirror positionable to an angle to reflect the area to the side of a motorcycle into the view of the rider and a second mirror attached to said assembly adjacent to an outside edge of first mirror and a provision for adjustment of the face of the second mirror toward the inside edge of the first mirror to an operative angle between 3 and 25 degrees. When positioned to the operative angle, the second mirror reflects the area immediately adjacent to the rear of the motorcycle and concurrently the first mirror reflects the area to one or both sides of the motorcycle allowing the rider of said motorcycle to view, concurrently, the areas to the side of the motorcycle and the area immediately adjacent to the rear of the motorcycle.

11 Claims, 2 Drawing Sheets

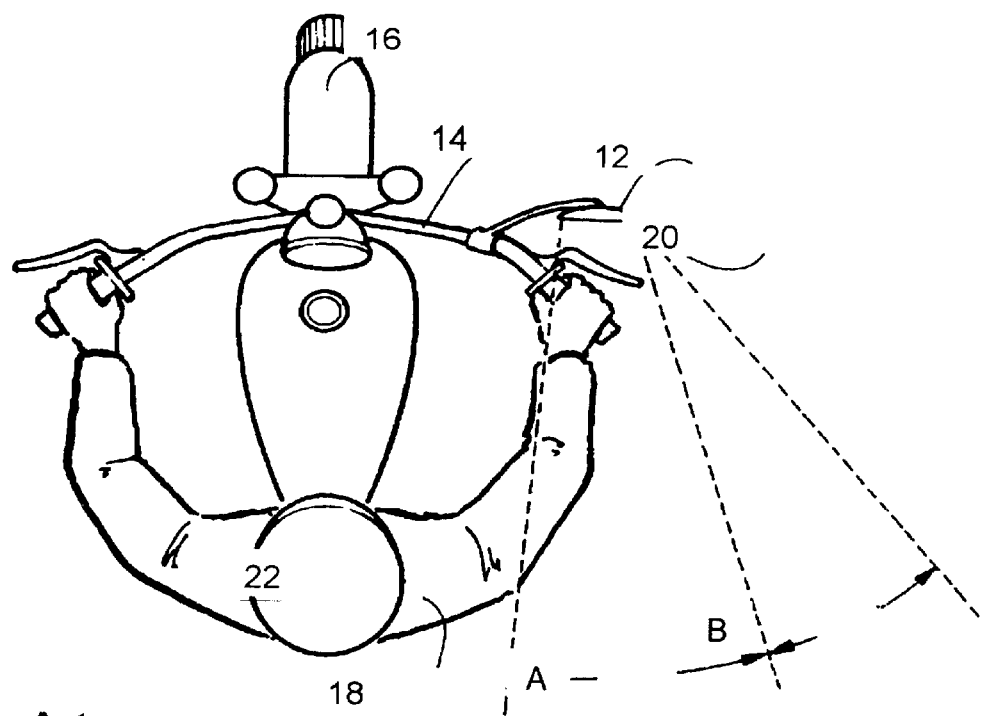
Prior Art Figure 1
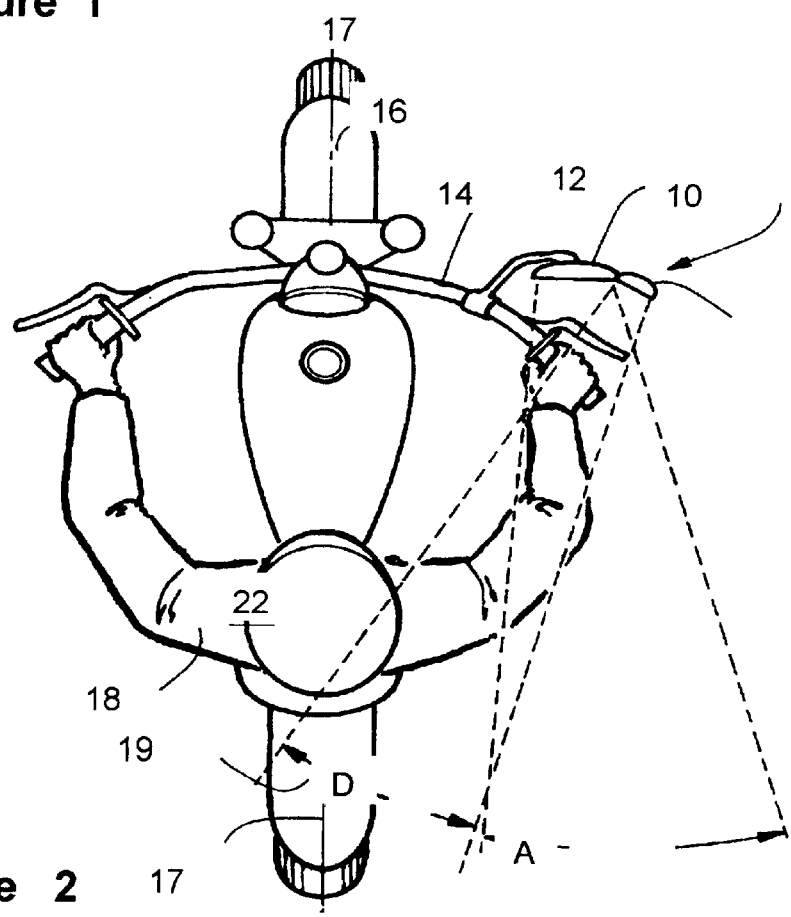
Figure 2

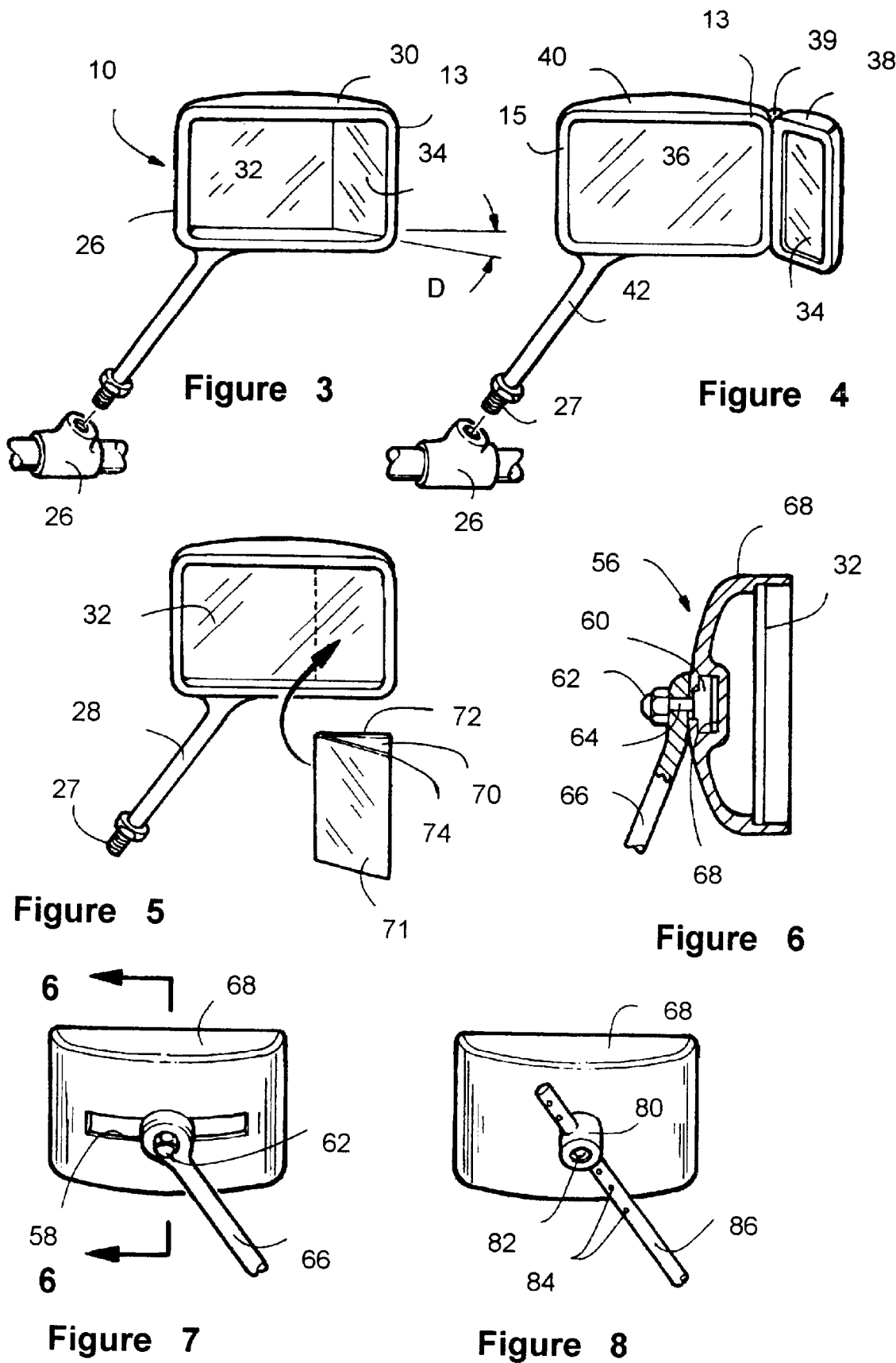

MOTORCYCLE MIRROR PROVIDING RIDER CONCURRENT VIEWING OF ROAD TO THE SIDE AND IMMEDIATELY TO THE REAR OF MOTORCYCLE

FIELD OF THE INVENTION

The present invention relates to a rear view mirror specifically designed for motorcycles, or similar vehicles. More specifically, the disclosed device is a motorcycle mounted mirror configuration which allows the area directly behind the motorcycle operator, just behind the rear tire of the vehicle, to be viewed by the rider. Concurrently, the device also allows for viewing by the rider of the road area immediately to the side or sides of the motorcycle, depending on the number of the devices which are attached to the handlebars of the cycle. Currently, a blind spot exists in the road area immediately behind the rider of a motorcycle when using conventional motorcycle mirrors which are designed for automobile side viewing when operatively attached to a vehicle. As a consequence, such conventional motor automobile mirrors fail to concurrently show the area to the side of a motorcycle to the rider along with the area of the road immediately behind the rider when operatively mounted on a motorcycle handlebar.

BACKGROUND OF THE INVENTION

Observing motorcycle riders on the highway, it is very noticeable that when changing lanes riders turn their heads to look back immediately behind their motorcycle, even though they have handle bar mounted mirrors. Such rider action is consistent in that most riders are aware of the blind spot directly behind the motorcycle and only by turning their heads can they view this area of the road. Helmet laws have only made it more cumbersome for the rider to view this posterior area of the road immediately behind the rider as peripheral vision is severely inhibited by helmets. Still further, many helmets distort or severely inhibit the rider's hearing which handicaps the rider's awareness of vehicles in his proximity since they cannot be heard adequately.

Conventional rear view mirrors are designed show the area to the side of the vehicle, with any enhancement being to broaden the side area viewed farther out to the side of the viewer. In an automobile, viewing of the area immediately posterior to the vehicle is accomplished by a rear view mirror center mounted on the windshield. By looking into the reflection in the rear view mirror, the driver accomplishes the task of viewing directly behind the vehicle to ascertain the proximity of another vehicle to the rear. In large vehicles, such as trucks, where a rear view mirror on the windshield is not possible, the side mirrors are extended as far as permissible in an attempt to see behind the vehicle. However, such extended side mirrors still fail to see the first few feet immediately adjacent to the rear end of the vehicle. In the case of very large vehicles, unlike the unprotected motorcycle rider, any following vehicles that are too close to the rear are more of a liability to themselves, than to the large vehicle in front of them, since striking a truck of such size with a car generally only has serious consequences for the car.

However, with the relative small size of a motorcycle, a vehicle approaching or following closely to the rear of the motorcycle produces a great hazard to the motorcycle operator. It is thus very desirable for the motorcycle rider to know exactly what is following to the immediate rear of his vehicle, especially the first few feet, since a vehicle striking the unprotected motorcyclist would cause severe injuries to the motorcyclist.

Unlike the extreme extension of side mounted mirrors of the truck which attempt to provide a view of the road a few feet distant to the immediate rear of the vehicle, mirrors on motorcycles should not extend past the end of the handlebars due to the safety of the rider. The disclosed device accomplishes the task by making it possible for the operator of a motorcycle, or any like vehicle, to not only view the area to the side of the vehicle, but concurrently to also view the area directly behind their vehicle. This is accomplished by means of a split image mirror, a planar mirror with a secondary mirror attached, or a secondary enhancement mirror at a specific angle range, to be added on the existing handlebar mounted mirror of a motorcycle. This secondary mirror is on the outermost side of the normal side viewing planar mirror, directed so as to view or enhance the view of the area at the posterior position of the rider, immediately adjacent to the rear of the motorcycle, and not a few feet behind it as provided by conventional mirrors or mirrors extended to the side of a vehicle. This posterior viewing enhancement is accomplished by the means of a convex mirror which will extend the posterior viewing area.

Many advances have been made in the field of rearward viewing side mirrors, with all relegated to either style, shape and mounting, or improving and enhancing the viewing area to the side, specifically of automobiles in the manner described.

U.S. Pat. No. 5,784,211 by inventor Neil H. Mingledorff, discloses an auxiliary rearview mirror assembly for attachment to a side-mounted vehicle rearview mirror. This device has been conceived to increase and enhance the viewing area to the side of a vehicle only, as described by the graphs displayed in FIGS. 9, 10 and 11. It does nothing to reflect the area posterior to the motorcycle rider, immediately adjacent to the rear tire of the motorcycle.

U.S. Pat. No. 4,932,770, by Raymond D. Caravaty, teaches a dual planar mirror assembly of the type to be used on the outside rear vision mirror on the driver's side of a vehicle. These mirrors, too, can only be directed outwardly from the side of the vehicle and provide no increase in the ability to view the area immediately posterior to the motorcycle.

U.S. Pat. No. 4,929,074, by Milfred W. Urban, describes a unique mounting and shock absorbing invention to the side mirrors of a vehicle, enhancing only in an outward directional viewing.

U.S. Pat. No. 4,917,485, by William K. Boldwin, Sr., teaches a system of mirrors mounted on the side and on the windshield of an automobile, not useable on a motorcycle.

U.S. Pat. No. 4,715,701, by Milfred W. Urban, again describes a continuation of the invention regarding a mounting and shock absorbing systems of an automobile rear view mirror, and is intended to extend side viewing and is also not intended for motorcycle attachment.

U.S. Pat. No. 4,303,308, by Hy H. Kobrin, discloses another automobile side mounted rear view mirror, with a planar mirror in combination with a convex mirror to enhance the side viewing, for the driver of an automobile. This invention still relies on the windshield rear view mirror to see the area directly behind the vehicle.

U.S. Pat. No. 4,105,295, by Robert T. Skilliter, Jr., teaches of a mirror mounting system in which the glass elements are retained in a frame formed of a synthetic resin to relieve the forces exerted by the elements that will crack the glass or frame. This system would be useable on motorcycles, but has not been directed at the need described herein.

U.S. Design Pat. No. 255,792, by Harrison, deals with the design of exterior features of side mounted automobile rear view mirrors and yields not to the enhancement of viewing immediately rearward of a motorcycle.

Consequently, there exists a need for a rear view mirror specifically designed for motorcycles and any other like vehicles, to view or enhance the area directly behind the rider.

SUMMARY OF THE INVENTION

The present invention herein disclosed is a handlebar mounted mirror imaging device for concurrent viewing of the area immediately to the side of a motorcycle as well as the area of the road immediately adjacent to the rear tire of a motorcycle. The device accomplishes this intended viewing enhancement by providing a means of viewing the posterior area behind the operator of a motorcycle or like vehicle in conjunction with a conventional handlebar mounted side view mirror. The means of viewing the area immediately adjacent to the rear of the motorcycle with concurrent viewing of the area to the side of the motorcycle is provided by an angled rear view planar mirror adjacent to a planar mirror at an angle to display the area to the side of the motorcycle. A means of attachment to the handle bar of the vehicle is in the form of an adjustable extension arm attachable to the handlebar at one point and connected to the shroud of the mirror assembly at the distal end. Housed within the mirror shroud will be a combination of the normal planar mirror providing viewing immediately to the side of the operator and adjacent to it on the outside edge, and the planar or enhancement mirror angled to provide viewing the area immediately adjacent to and directly behind the operator.

The angle between these mirrors may vary substantially between a range of 3° to 25°. The secondary mirror will encompass viewing the complete area immediately behind the operator and rear tire of the motorcycle, with its scope out to the side area where the normal planar mirror view stops. Enhancement of a secondary mirror is accomplished by using a convex surface expanding the field of view. With similar mirror units on both sides of the operator, motorcycles and similar vehicles will have a means of visually scanning the complete area to the side of, and immediately behind, their vehicle. Such a viewing enhancement provides a major increase to the safety of the unprotected motorcycle rider, especially when a helmet is being worn that negatively impacts both visual and auditory abilities of the rider, handicapping the rider's sense of surrounding vehicles that are a danger.

Where motorcycles and similar vehicles have existing handlebar mounted planar mirrors in place, the disclosed device in another embodiment may be added to the outside edge of the existing mirrors with a number of different common attachment means such as adhesive, hook-loop fabric, screws or similar mating fasteners.

In embodiments where the disclosed device is provided and handlebar mounted as a complete mirror assembly with an extension arm and handle handlebar clamp, the device optionally provides a means of adjustment for the rider viewing location, and the angle in which the device faces the rider. This means adjustment is accomplished through a "T" slot running transversely along the concave back surface of the mirror shroud. The "T" nut slides within the curved slot, relocating the mirror while adjusting the angle that the mirror assembly is directed and tightened by means of a bolt through an aperture in the mirror support arm.

The object of this invention is to provide operators of motorcycles and like vehicles with a means of viewing the area directly behind their vehicle immediately rearward of the rear tire.

Another object of the invention is to make riders of motorcycles and like vehicles conscious of vehicles approaching, or approaching too close directly behind them.

Still another object of this invention is to make riders of motorcycles and like vehicles aware of when it is completely safe to change lanes without turning their heads to look behind their vehicle.

An additional object of this invention is to enhance the visual acuity of motorcycle riders wearing helmets to vehicles in their immediate vicinity.

The invention accordingly comprises the features of construction, combination of elements, and arrangement of parts that will be exemplified in the construction hereinafter set forth in the specification, and the scope of the invention will be indicated in the claims.

BRIEF DESCRIPTION Of THE DRAWING FIGURES

The accompanying drawings, which are incorporated in and form a part of this specification, illustrate embodiments of the invention and together with the description, serve to better explain and define the principles of the invention.

FIG. 1, Prior Art, depicts a motorcycle and rider, with handlebar mounted conventional side view mirror, displaying the rear view angle and enhancement angle, out from the side of the rider.

FIG. 2 depicts a motorcycle and rider using the device herein disclosed, displaying the rear view angle and enhancement angle of view of the road area located immediately behind the operator.

FIG. 3 depicts a perspective view of the disclosed motorcycle rear view mirror assembly.

FIG. 4 depicts a perspective view of and aftermarket embodiment of the disclosed device attached to a conventional handlebar mounted mirror unit.

FIG. 5 depicts a plan view of the after market enhancement embodiment with a ball swivel angular adjustment.

FIG. 6 depicts a cross section through the disclosed motorcycle rear view mirror assembly displaying the "T" slot and "T" nut attachment means.

FIG. 7 depicts the back view of the disclosed rear view mirror assembly showing the longitudinal "T" slot, extension arm and handlebar clamp.

FIG. 8 depicts another embodiment of the motorcycle rear view mirror assembly attached to the distal end of an extension arm.

DETAILED DESCRIPTION OF PREFERRED EMBODIMENTS

Referring now to the drawing FIG. 1, Prior Art, showing a conventional handle bar mounted rear view mirror 12 on the handlebar 14 of a motorcycle 16. The motorcycle rider 18, looking in the planar mirror 12, will only be able to see the area inscribed by the angle A. Conventional side viewing enhancement 20, commonly a convex split-image mirror, or after-market attached viewer, enlarges the viewing angle B outwardly from angle A, increasing the operators vision to the side but leaving a blind spot directly behind and immediately adjacent to the rear of the vehicle. Wearing of a helmet 22 by the rider 18, as is now required in most states, further limits the riders 18 view by retarding the peripheral vision of the operator and making turning of the head awkward. Additionally, the hearing of the rider 18 is also impaired by the helmet 18 thus dampening his awareness of any vehicle to the rear or side which might project noise to alert the rider 18.

The aforementioned shortcomings and others are overcome with the use of the disclosed device 10 which combines a first and second mirrored surface at a defined angle and determined attachment point to yield a complete view of the sides and the immediate rear or posterior of a motorcycle at the center axis 17 just behind the rear wheel 19. The device 10 may be manufactured as a complete unit or, using the after market rear viewing enhancement unit embodiment, it can be attached adjacent to the outside edge 13 of a handlebar mounted side view mirror 12, as depicted in FIGS. 2 and 4. A complete unit yielding the concurrent viewing of the side view of angle A and also the rear area of angle C substantially at the center axis 17 running through a motorcycle 16 from the front wheel through and immediately adjacent to the rear of the rear wheel 19 of the motorcycle 16 to the rider 18 can also be achieved by using the wedge shaped casing 70 of FIG. 7 which would best be attached at the outside edge 13 furthest away from the rider of the first mirror 12 in the form to a conventional side view mirror 12. As depicted in FIG. 2 and FIG. 4, the view from the conventional side viewing planar mirror 12 is shown with angle A, with the attachable enhancement mirror 24 as the second mirror forming the disclosed device 10 in attachable form, and with both mirrors positioned at the operational angle D opposed to each other, together yielding a concurrent view to the rider of the area depicted by viewing angle C, and showing the posterior area of the vehicle immediately to the rear of the motorcycle but out to the convergence with angle A.

FIG. 2 thus illustrates the increase in the rearward viewing area immediately behind the center rear portion of a motorcycle 16 afforded to the rider 18 with the addition of the disclosed device 10 as a unit or in the embodiment as an attachable enhancement mirror 24 or wedge shaped attachment. All embodiments thus combine two mirrored or reflective surfaces at a defined operative angle with each other, to thereby eliminate the blind spot immediately behind the rear tire of a motorcycle 16 which now plagues motorcycle riders.

FIG. 3 illustrates a complete mirror unit embodiment of the device 10 in a combined assembly featuring a shroud 30 connected to and providing a mount for the side viewing first mirror 32 and the rearward viewing inward angled second mirror 34 attached immediately adjacent to the outside edge 13 of the side viewing first mirror 32. When so attached at the operative angle D, the combination provides the view of angle C to the immediate rear of the vehicle to the rider 18 who may concurrently view the area to the side of the motorcycle 16 in angle B, through side viewing first mirror 32. A means for attachment of the device 10 to the handlebar 14 of the motorcycle 16 in the form of handlebar clamp 26 having a communicating screw mount 27 positioned and configured to engage threads 31 at the attachment end of extension arm 28 and with the distal end of the extension arm 28 being attached to the mirror assembly at mirror shroud 30. Of course, other means of attachment of the mirror assembly to the handle bar 14 might be used and are, as such, anticipated, however, the current best mode would be using the aforementioned means of attachment to the handlebar configuration.

Mounted to the shroud 30 is located the first mirror in the form of planar side viewing first mirror 32 having an inward edge 15 and outside edge 13 furthest away from the motorcycle 16. The rearward image displaying second mirror in the form of enhancement mirror 24 is attached to the shroud 30 or first mirror 32 or both, and angled inwardly toward the surface of side viewing first mirror 32 at the operative angle D, which is the angle that provides the reflection in the enhancement mirror 24 so the rider may view the posterior area immediately behind the rear tire of the motorcycle as depicted as angle C. Concurrently, the rider 18 may view the area to the side of the motorcycle 16 depicted in angle A in the side viewing first mirror 32 thereby providing a full field of vision behind the rider 18 to the rider. Currently, the best operative angle D is at an angle substantially between a range of angles from 3° to 25° depending on the rider 18 and the motorcycle 16, with an angle of about 3° to 25° being the current best mode to yield a reflection and view of the area immediately behind the rider 18 and the motorcycle 16. The device 10 as a complete assembly can be provided separately in a right side or left side configuration for attachment to the right or left side or both, of the handlebar 14 for a motorcycle 16, to provide the concurrent side and rear views to the motorcycle rider on one or both sides of the vehicle at once. With two devices 10 attached at both sides of the handlebar 14, the rider 18 is provided concurrently with a view of the area just behind the motorcycle 16 and the area adjacent to both sides of the motorcycle 16 thereby giving the rider 18 enhanced safety with a full view of his backside.

On motorcycles or like vehicles with mirrors already mounted when purchased, an add-on after market enhancement component will yield the configuration of device 10 to enhance the view of the rider 18. This is accomplished by using attachable rear viewing mirror 34 which has a cover 38 attached thereto and a means of attachment to the outside of the shroud 40 adjacent to the outside edge 13 of side view mirror 32 of an existing handle bar mounted unit as shown in FIG. 4. The operative angle D of the rearward viewing mirror 34 would be adjusted to properly display the area immediately to the rear of the motorcycle using a means of angular adjustment such as a hinge 39 which might also be part of the means of attachment of the rearward viewing mirror 34 and attached cover 38 to the existing mirror shroud 40. The means of attachment of the rearward viewing mirror 34 in this embodiment, in the current best mode, is a hinge 39 affixed to both the existing mirror shroud 40 and the cover 38 of the rearward viewing mirror. However, other means of attachment may also be used and are anticipated so long as they provide the ability to adjust the rearward viewing mirror 34 to the operative angle D in relation to the mirror surface 36 such that the rearward viewing mirror 34 displays a reflection of the area immediately adjacent to the rear of the motorcycle 16 while the side view mirror 32 concurrently reflects the area to the side of the motorcycle 16 to the eye of the rider 18.

FIGS. 6 and 7 depict an axially positionable embodiment of a complete unit of the device 10 featuring a rear view mirror assembly 56, having a means for axial adjustment of the position of the device 10 in the form of a slot 58, in the rear surface of the shroud 68. A bolt 62 attached through the distal end of arm 66 and having a frictionally engageable head 60 for engagement with the internal surface of the shroud 68 may be axially adjusted to a position in slot 58 communicating between the exterior and interior surface of the shroud 68 to axially locate the unit 56 on the head 60 to a user desired viewing location where little or no head movement is required for concurrent side and rearward viewing by the rider. The head 60 may then be locked tight by a tightening nut 64 thus causing the head 60 to tighten onto the interior shroud surface adjacent to slot 58.

Extension arm 66 with a conventional handle bar clamp 26 at the attachment end would provide attachment to the vehicle through cooperative engagement at the distal end with the bolt 62.

A final embodiment depicted in FIG. 5 would feature an after market embodiment of the device for attachment to the outside edge 13 of the conventional planar mirror surface 36 of conventionally mounted side view mirrors. This embodiment would feature a wedge shaped casing 70 having a rearward viewing mirror 71 attached on the front side of the casing 70. On the rear side of the casing 70 a means of attachment to the surface of the conventional mirror surface 36 would be provided in this case in the form of adhesive 72. The wedge shaped casing 70 would be configured such that the rearward viewing mirror 71 on the front surface would yield the operative angle D when the casing 70 is attached to the planar mirror surface 36 thus allowing the rider to view the area immediately adjacent to the rear of the motorcycle in the rearward viewing mirror 71 while concurrently viewing the area to the side of the motorcycle in the planar mirror surface 36. The angle front surface of the wedge shaped casing 70, and thus the attached rearward viewing mirror 71, can be easily adjusted during manufacture to provide the operative angle D on different motorcycles by increasing or decreasing the size of the larger outdated edge 74 of casing 70 to yield the operative angle D for the rider to view to both the immediate rear, and the side of the motorcycle. Of course, such changes in the size of the outward edge 74 would be calculated during manufacture to yield casings 70 dimensioned to provide the operative angle D on the intended motorcycle.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

What is claimed is:

1. A motorcycle rear view mirror assembly for attachment to a motorcycle having a center axis extending from the front wheel mount to the rear wheel mount, comprising:

a handlebar mounted clamp, said clamp having a clamp aperture configured to cooperatively engage an attachment end of an elongated arm;

said rear view mirror assembly having a first mirror, said first mirror having an inside edge and an outside edge, said first mirror positionable to an angle to reflect the area to the side of a motorcycle into the view of the rider of said motorcycle;

said rear view mirror assembly having a second mirror, said second mirror attached to said assembly adjacent to said outside edge of said first mirror;

said rear view mirror assembly having an assembly mount cooperatively engageable with the distal end of said arm opposite said attachment end;

means for lateral translation of said mirror assembly upon said distal end of said arm;

means of adjustment of the face of said second mirror toward the inside edge of said first mirror to an operative angle;

said second mirror when positioned to said operative angle reflecting the area at said center axis immediately adjacent to the rear of said motorcycle;

said first mirror and said second mirror concurrently reflecting said area to the side of said motorcycle and sand area immediately adjacent to said rear of said center axis of said motorcycle when said second mirror is at said operative angle to said first mirror; and whereby said rider of said motorcycle may view both, said area to the side of said motorcycle, and said area immediately adjacent to said rear of said center of said motorcycle concurrently when operating said motorcycle.

2. The motorcycle rear view mirror assembly as defined in claim 1 additionally comprising a mirror shroud, said mirror shroud providing a frame about the perimeter of said first mirror;

means of attachment of said second mirror to said mirror shroud adjacent to said outside edge of said first mirror.

3. The motorcycle rear view mirror assembly as defined in claim 2 wherein said means of attachment of said second mirror to said mirror shroud is a hinge.

4. The motorcycle rear view mirror assembly as defined in claim 2 additionally comprising said mirror shroud providing a frame for the perimeter of said first mirror and said second mirror attached at said outside edge.

5. The motorcycle rear view mirror assembly as defined in claim 1 wherein said operative angle is between 3 degrees and 25 degrees.

6. The motorcycle rear view mirror assembly as defined in claim 1 wherein said operative angle is substantially 3 degrees.

7. The motorcycle rear view mirror assembly as defined in claim 1 further comprising a wedge shaped casing, said wedge shaped casing providing a mount for said second mirror upon a front side of said wedge shaped casing;

said wedge shaped casing having a rear surface;

means of attachment of the rear surface of said wedge shaped casing upon a surface of said first mirror adjacent to said outside edge;

said wedge shaped casing configured such that said second mirror mounted on said front side yields said operative angle when said wedge shaped casing is attached said surface of said first mirror adjacent to said outside edge.

8. The motorcycle rear view mirror assembly as defined in claim 7 wherein said means of attachment to said rear surface of said wedge shaped casing upon the surface of said first mirror adjacent to said outside edge is adhesive.

9. The motorcycle rear view mirror assembly as defined in claim 7 wherein said first mirror is a mirror already mounted upon a conventional motorcycle handlebar.

10. The motorcycle rear view mirror assembly as defined in claim 1 wherein said assembly mount is cooperatively engageable with said distal end of said elongated arm using an aperture communicating through said assembly mount, said aperture allowing communication of said arm therethrough, said arm thereby having lateral translation on said arm, a second aperture in said assembly mount communicating with said first aperture, and a set screw cooperatively engageable in said second aperture, said set screw having an adjustment end accessible from the exterior of said second aperture, and a contact end capable of engaging said arm communicating through said first aperture thereby allowing fixed adjustable engagement of said assembly mount upon said arm at a determined position.

11. The motorcycle rear view mirror assembly as defined in claim 10 wherein said arm attaches to said mount and extends away from said center axis at an acute angle in relation thereto, whereby lateral translation of said mirror assembly on said arm provides both vertical and lateral adjustment of said determined position of said mirror in relation to said center axis.

* * * * *